UNITED STATES PATENT OFFICE.

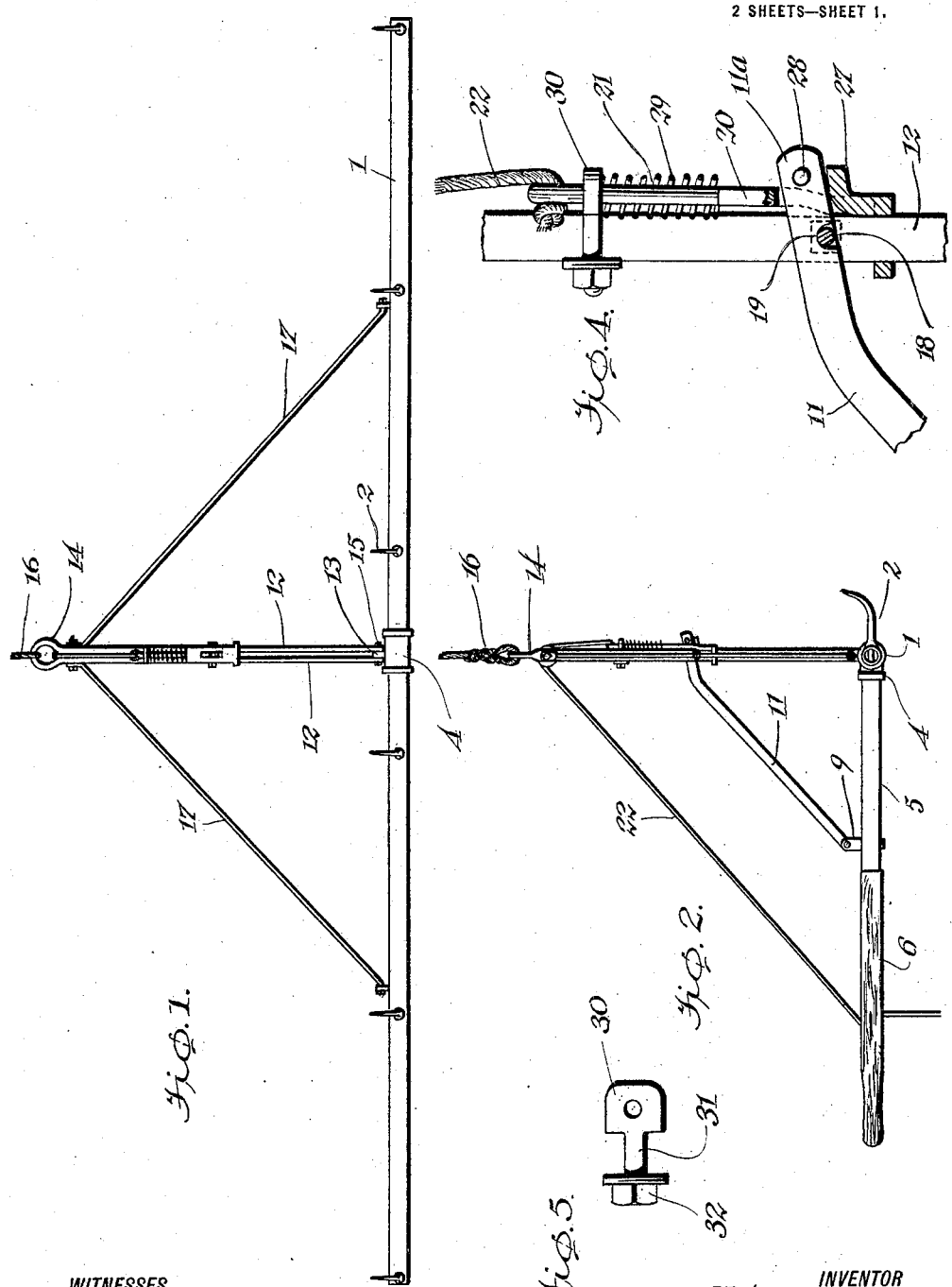

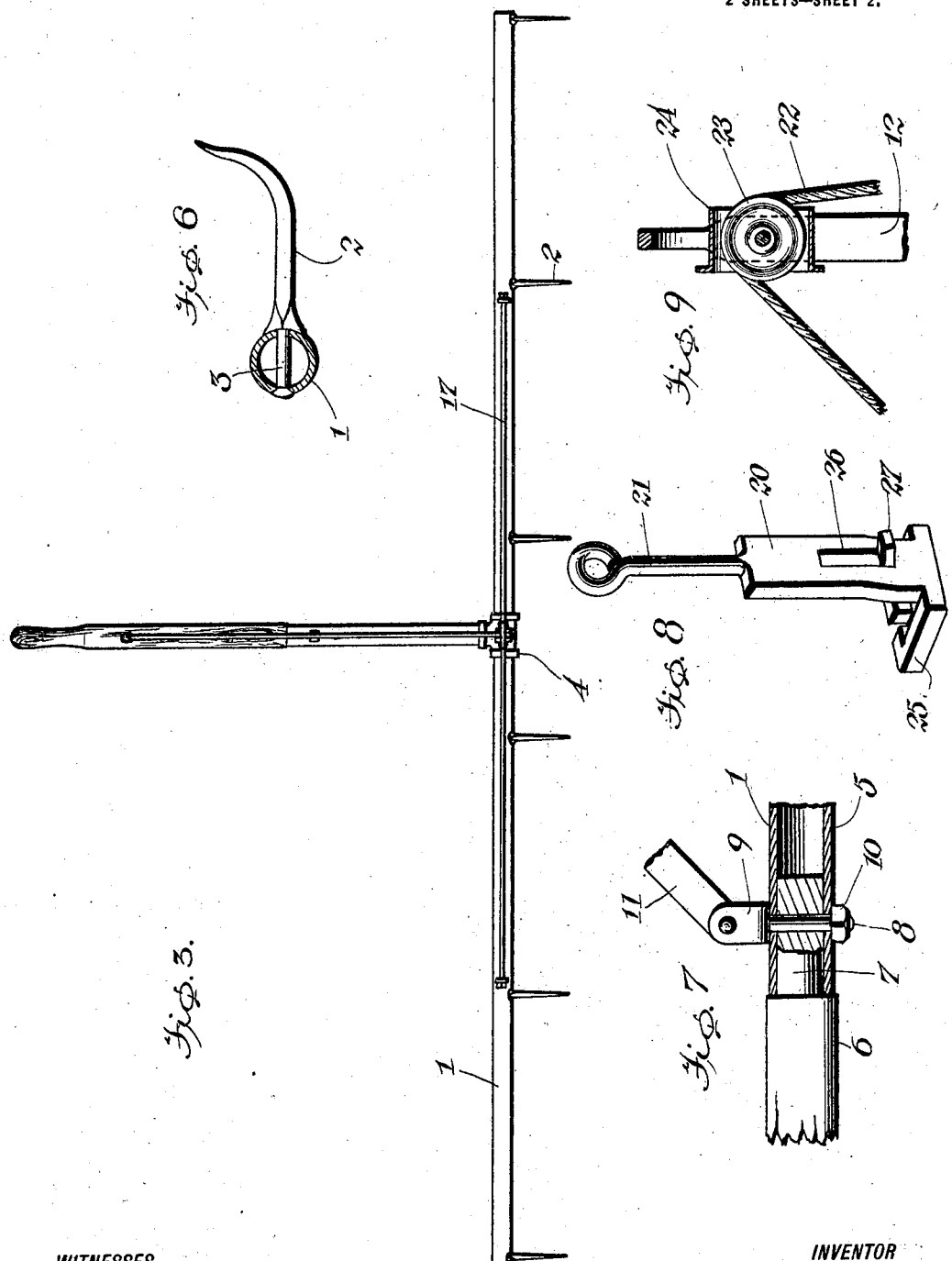

HERBERT AUGUSTUS WATERMAN, OF LIBERAL, MISSOURI.

BALE-FORK.

1,395,692.  Specification of Letters Patent.  Patented Nov. 1, 1921.

Application filed September 2, 1920. Serial No. 407,694.

*To all whom it may concern:*

Be it known that I, HERBERT AUGUSTUS WATERMAN, a citizen of the United States, and a resident of Liberal, in the county of Barton and State of Missouri, have invented certain new and useful Improvements in Bale-Forks, of which the following is a specification.

My invention is an improvement in bale forks, and has for its object to provide a fork of the character specified especially adapted for handling bales of hay, wherein a supporting bar is provided, having means for supporting and permitting the same to be transported, together with a series of impaling hooks for engaging the bales, the said hooks being so connected to the bar that they may be simultaneously held in operative position, or tripped to release the bales.

In the drawings:

Figure 1 is a front view of the improved fork;

Fig. 2 is an end view;

Fig. 3 is a top plan view;

Fig. 4 is a detail section showing the tripping mechanism;

Fig. 5 is a plan view of the latch or trip guide;

Fig. 6 is a transverse section through the fork;

Fig. 7 is a sectional detail showing the connection between the brace and the handle;

Fig. 8 is a perspective view of the latch or trip detached;

Fig. 9 is a sectional detail showing the pulley for the trip rope.

In the present embodiment of the invention a supporting bar 1 is provided, the said bar being in the present instance a section of pipe, and with this bar there is connected a series of impaling teeth or spikes 2. Each of these spikes 2 has a shank, 3 which is passed diametrically of the bar through registering openings, and the shank is headed on the opposite side of the bar from the tooth or spike. Each of the spikes, as shown more particularly in Figs. 2 and 6, curves upwardly at its bill so that the bill of the spike is at approximately a right angle with respect to the body.

A T 4 is arranged at the center of the bar, and with the lateral branch of the T there is connected a handle, consisting of a metal section 5 in the form of a pipe, and a wooden section 6 which is the handle proper, Referring to Fig. 7, it will be seen that the wooden portion 6 of the handle has a reduced portion 7 which fits within the outer end of the pipe 5, and a bolt 8 having ears 9 at its head is passed through the handle at this point, engaging both the reduced portion 7 and the pipe 5, the said bolt being engaged by a nut 10 below the handle.

A link 11 is pivoted between the ears 9 for a purpose to be presently described, and a hanger, indicated at 12, is pivoted to an upstanding lug 13 from the body of the T. This hanger is in the form of a bar of metal doubled upon itself, having an eye 14 at the junction of the two portions, the said portions at the end remote from the eye being lapped on opposite sides of the lug 13 and pivoted thereto, as indicated at 15. Thus the supporting bar 1 may rotate with respect to the hanger, which is connected with suitable hoisting mechanism (not shown) by means of a cable 16 which is connected with the eye 14. The hanger is also braced against the bar at each side of the hanger by means of inclined braces 17.

The bar 1 is normally held with respect to the hanger in the position shown in Fig. 2, that is, with the spikes 2 extending at approximately a right angle with respect to a vertical plane through the hanger and bar 1, by means of releasable latch or trip mechanism.

The end of the link 11 before mentioned extends between the two portions of the hanger 12, as clearly shown in Fig. 4, and at approximately midway between its ends the hanger has a cross pin 18. That portion of the link 11 remote from the handle extends at an obtuse angle with respect to the body of the said link, and this portion 11ª has a notch 19 in its under edge which is adapted to engage the cross pin 18.

The portion 11ª of the link also engages tripping mechanism, the said mechanism comprising a plate 20 which is mounted to slide on the forward edge of the hanger. This plate has an upstanding eye 21 to which is connected one end of a trip rope 22, the said rope passing over a pulley 23 journaled in a housing 24 at the upper end of the hanger 12, and from thence to the portion 6 of the handle.

The plate 20 is guided on the hanger by means of an angular portion 25 which is provided with suitable openings for receiving the two portions of the hanger and also for permitting the passage of the link. As shown in Fig. 4 the hanger passes through this opening in the angular portion 25 and the link passes through a vertical slot 26 in the plate 20, the plate having a guard 27 at the lower end of the slot. The link is provided with a cross pin 28 at the opposite side of the plate 20 from the notch 19, which limits the movement of the link 11 in one direction.

A coil spring 29 normally acts to hold the tripping device in the position of Figs. 2 and 4, the said spring encircling the shank of the eye 21, and being arranged between the upper end of the plate 20 and a guide eye 30 supported by the hanger. This guide eye 30, as shown in Fig. 5, has a shank 31 which passes between the two portions of the hanger, and the shank is threaded for engagement by a nut 32 on the opposite side of the hanger from the body of the eye.

Six spikes or hooks are provided, and it will be noticed that the two innermost hooks are spaced apart from each other a less distance than the spacing of the other hooks, that is, two hooks 2 may be used for engaging a single bale, in which case the outermost hooks will engage a bale each, five bales being thus supported by the bar. When the bales are on edge or on end, with their edges turned toward the bar, six bales may be engaged by the six hooks.

In operation, the parts are arranged as shown in Figs. 1, 2 and 3, the tripping mechanism being as shown in Fig. 4. Now the bales are impaled on the spikes and by means of the cable they are hoisted and transported to the place desired. To release the bales, the operator pulls on the rope 22. This moves the plate 20 upwardly, lifting the link 11 and disengaging the notch 19 from the pin 18. Now the link 11 is free to slide between the two members of the hanger 12, and the bales are released, the weight of the bale swinging the bar 1 until the hooks will slip out from their engagement with the bale. To reset the fork, the operator pulls down on the handle 5—6. As soon as the notch 19 comes in register with the pin 18, they will engage and the spring 29 will force the plate 27 downwardly, to prevent accidental release of the parts.

I claim:

1. A bale fork comprising a bar having spikes for impaling the bales, a handle extending radially from the bar in the opposite direction to the spikes, a hanger for suspending and transporting the bar, hinged to the bar at the center thereof, releasable means for holding the bar with the handle and the spikes at right angles to the hanger, and trip mechanism for releasing said means, said holding means comprising a link pivoted to the handle and extending through the hanger, said hanger having a stop pin and the link, a notch for engagement by the pin, and a plate mounted to slide on the hanger and having an opening through which the link extends, said plate being normally spring pressed downward, and a flexible member connected with the plate for moving the same upwardly to release the link.

2. The combination with a body having a gripping device, of a hanger pivoted thereto, a handle rigidly connected to said body, a link pivoted to said handle, and a pin carried by said hanger and adapted for detachable engagement with said link whereby to detachably hold the body in a set position.

3. A bale fork comprising a bar having means for engaging a series of bales, a handle extending radially from the bar in the opposite direction to the engaging means, a hanger for suspending the bar and hinged to the center thereof, releasable means arranged between the bar and the hanger for holding said bar with the engaging means in engaging position, and trip mechanism for releasing the said means, the holding mechanism comprising a link pivoted to the handle, the hanger having an opening through which the link extends, and said link and hanger having interengaging means for preventing movement of the link in a direction to release the bales, the trip comprising a plate mounted to slide on the hanger and having an opening through which the link extends for moving the link into disengaged position.

4. A bale fork comprising a bar having means for engaging a series of bales, a handle extending radially from the bar in the opposite direction to the engaging means, a hanger for suspending the bale and hinged to the center thereof, releasable means arranged between the bar and the hanger for holding said bar with the engaging means in engaging position, and trip mechanism for releasing the said means, the holding mechanism comprising a link pivoted to the handle, the hanger having an opening through which the link extends, and said link and hanger having interengaging means for preventing movement of the link in a direction to release the bales.

5. The combination with a body having a gripping device, of a hanger connected thereto, a handle rigidly connected to said body, a link pivoted to said handle, said hanger being provided with link engaging means adapted to detachably hold the link in a set position with relation to the hanger, and a releasing device slidable on said hanger and having an opening receiving said link.

6. The combination with a body having article engaging means, of a hanger pivoted thereto, a handle rigidly connected to said body, a link pivoted to said handle and slidable with relation to said hanger, said hanger being provided with means to hold said link in a set position with relation to the hanger, and a releasing device slidably associated with said hanger and engaged with the adjacent end portion of said link whereby to release the link from engagement with the holding means on said hanger.

7. The combination with a body having article engaging means, of a hanger pivoted thereto, a handle rigidly connected to said body, a link pivoted to said handle and slidable with relation to said hanger, said hanger being provided with means to hold said link in a set position with relation to the hanger, a releasing device slidably associated with said hanger and engaged with the adjacent end portion of said link whereby to release the link from engagement with the holding means on said hanger, and a spring associated with said releasing device for urging said link into locking engagement with said holding means.

8. The combination with a body having article engaging means, of a hanger pivoted thereto, a handle rigidly connected to said body, a link pivoted to said handle and slidable with relation to said hanger, said hanger being provided with means to hold said link in a set position with relation to the hanger, a releasing device slidably associated with said hanger and engaged with the adjacent end portion of said link whereby to release the link from engagement with the holding means on said hanger, a spring associated with said releasing device for urging said link into locking engagement with said holding means, and actuating means for said releasing device.

9. The combination with a body having article engaging means, of a hanger pivoted thereto, a handle rigidly connected to said body, a link pivoted to said handle and slidable with relation to said hanger, said hanger being provided with means to hold said link in a set position with relation to the hanger, a releasing device slidably associated with said hanger and engaged with the adjacent end portion of said link whereby to release the link from engagement with the holding means on said hanger, a spring associated with said releasing device for urging said link into locking engagement with said holding means, and actuating means for said releasing device, said releasing device being formed with a guide slidable on said hanger.

10. The combination with a body having article engaging means, of a hanger pivoted thereto, a handle rigidly connected to said body, a link pivoted to said handle and slidable with relation to said hanger, said hanger being provided with means to hold said link in a set position with relation to the hanger, a releasing device slidably associated with said hanger and engaged with the adjacent end portion of said link whereby to release the link from engagement with the holding means on said hanger, a spring associated with said releasing device for urging the link into locking engagement with said holding means, and a guide carried by said hanger, and slidably receiving said releasing device.

HERBERT AUGUSTUS WATERMAN.